United States Patent [19]

Hsu et al.

[11] Patent Number: 5,195,050
[45] Date of Patent: Mar. 16, 1993

[54] SINGLE CHIP, MODE SWITCHABLE, MATRIX MULTIPLIER AND CONVOLVER SUITABLE FOR COLOR IMAGE PROCESSING

[75] Inventors: Ken W. Hsu, Pittsford; Lionel J. D'Luna, Rochester; Hur Jay Yeh, Rochester; Glen W. Brown, Fairport, all of N.Y.

[73] Assignee: Eastman Kodak Company, Rochester, N.Y.

[21] Appl. No.: 570,187

[22] Filed: Aug. 20, 1990

[51] Int. Cl.$^5$ .......................................... G06F 15/336
[52] U.S. Cl. ................................ 364/728.01; 364/754
[58] Field of Search ...................... 364/728.01, 724.12, 364/736, 754, 757

[56] References Cited

U.S. PATENT DOCUMENTS

| | | | |
|---|---|---|---|
| 3,748,451 | 7/1973 | Ingwersen | 364/728.01 |
| 4,493,048 | 1/1985 | Kung et al. | 364/728.01 X |
| 4,937,774 | 6/1990 | Malinowski | 364/728.01 X |

Primary Examiner—Tan V. Mai
Attorney, Agent, or Firm—Edward Dugas

[57] ABSTRACT

An integrated circuit that uses the same coefficient registers, multipliers and adders to perform both matrix multiplication and convolution operations. The multipliers are arranged in columns and rows with the matrix multiplication adders located in the corresponding columns and with the adder for producing the convolution output located in one of the columns. A mode selection switch causes the multiplexers to change input data routing based on the mode selected. The circuit allows loading of all the coefficients or selection of hardwired coefficients. By rerouting the inputs of the multipliers using the multiplexers, the circuit can be easily configured for either mode of operation. The outputs corresponding to the columns are either output directly during matrix multiplication or provided to the convolution adder. The provision of an internal pseudo random number generator, serial inputs and outputs for test data and a signature analysis signal generating circuit allows the circuit to be easily internally tested.

3 Claims, 14 Drawing Sheets

CONVOLVED OUTPUT

SINGLE CHIP, MODE SWITCHABLE, MATRIX MULTIPLIER AND CONVOLVER SUITABLE FOR COLOR IMAGE PROCESSING

BACKGROUND OF THE INVENTION

1. Field of the Invention

The present invention is directed to a reconfigurable integrated circuit that can be configured as a matrix multiplier or a convolver and, more particularly, to a single chip that can, in a first mode, be used to perform matrix multiplication operations used for data transformation such as matching color data to a color display or for transforming data from one color space to another, for example from RGB to YIQ and, in a second mode, be used to perform a convolution operation on the data as for example to enhance image data and improve the sharpness of the image produced on a display.

2. Description of the Related Art

In the data processing associated with a color imaging system three channel color data is available either by direct exposure, as in a CCD camera, or can be produced by a digital scanner. To obtain a high quality output, color and sharpness attributes of the data need to be specially processed. To reproduce optimum color, taking into account spectral sensitivities and display properties of a complete imaging chain, a three by three matrix multiplication conversion operation is performed. A convolution operation is applied to the luminance channel of the color data to enhance the sharpness of the image. Traditionally, these operations have been performed by a processor (computer) performing non-real-time operations, although separate chips dedicated to these operations have been produced. What is needed is a hardware solution to both of these functions on a single chip exploiting the commonalities of the two operations, which will allow the operations necessary for image processing to be performed in real time.

SUMMARY OF THE INVENTION

It is an object of the present invention to provide a single integrated circuit solution to both the matrix multiplication and convolution operations necessary for an image processing system.

It is another object of the present invention to produce a circuit with programmable coefficient capability which enhances the ability to switch from the matrix multiplication mode to the convolution mode.

It is another object of the present invention to produce a circuit with built-in test circuits for testing the matrix multiplication and convolution operations.

It is also an object of the present invention to provide a pipeline circuit structure for matrix multiplication and convolution that allows real time processing of color signals.

The above objects can be attained by an integrated circuit that uses the same coefficient registers, multipliers and adders to perform both matrix multiplication and convolution operations. The circuit has the coefficient registers connected to allow loading of all the coefficients. By rerouting the inputs to the multipliers using a series of multiplexers, the circuit can be easily configured for either mode of operation. The provision of an internal pseudo random number generator, test data scan-in inputs and scan-out outputs, as well as signature analysis circuits allows the circuit to be easily internally tested.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
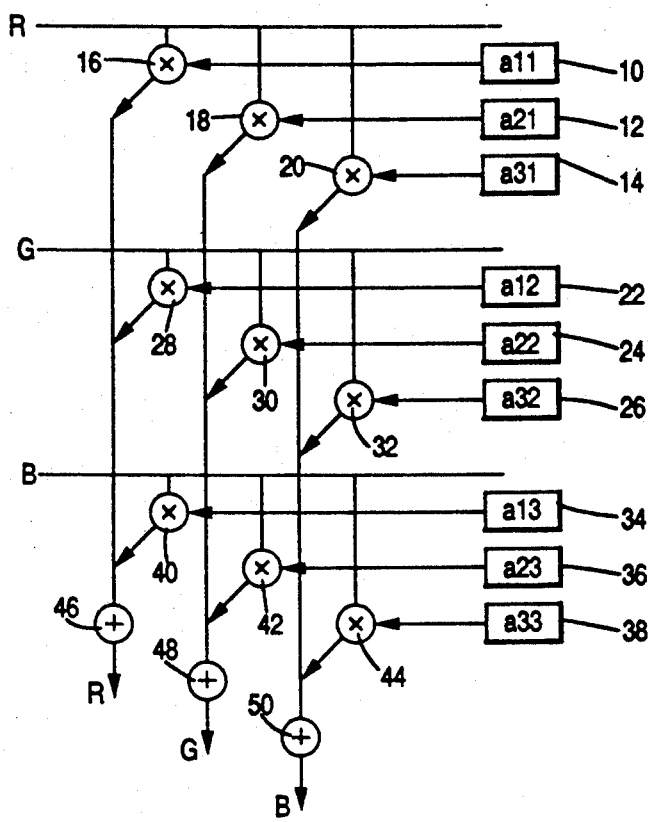
FIG. 1 illustrates the matrix multiplication operation performed by the circuit of the present invention.

The present invention is a method and apparatus implementing two algorithms, the first for a color matrixing operation and the second for a two dimensional convolution operation both used in electronic imaging and photocopying. The single chip of the present invention can be programmed or configured to perform either of these functions. Nine array multipliers are used to perform both three by three matrix multiplication and a three by three convolution operation. Three adders used in the matrix multiplication operation are also used along with an additional adder during the convolution operation. Coefficients for both the matrix multiplication and convolution operation are programmable either by serially loading the contents into coefficient storage registers or by metal layer hardwiring the coefficients. A built in test structure is designed into the single chip circuit to guarantee high fault coverage.

The integrated circuit of the present invention is a high performance user selectable three by three kernel matrix multiplier or a 2-D convolver. A mode select pin, controllable by a jumper, switch or a computer, is provided to allow switching between the two modes. If the circuit of the present invention is clocked with a 16 megahertz clock, the present invention will allow real time NTSC video processing using a single chip. The input ports of the invention allow the inputting of 10 bit values. Coefficient input ports are also provided allowing either serial or parallel loading of 10 bit values. The parallel loaded coefficients can also be hardwired using the metal layer in situations where fixed coefficients are desired. The present invention is built with 2 test methodologies (scan path and signature analysis), so that the user has complete fault coverage. The internal data path for multiplication and addition is 16 bits wide to provide sufficient accuracy for color signal processing and the outputs of the matrix multiplication have a 16 bit word length. The convolution output is also a 16 bit word, however, the weight has been shifted 2 bits to the most significant bit. The invention is free of overflow in the signed number addition operation. If the invention is configured in an 84 pin package the output must be truncated to 10 bits each.

The present invention, as previously discussed has two modes of operation. In the first mode, where mode selection is set to zero, the circuit performs a matrix multiplication. Each output is the weighted sum of all three input words, for example, red, green and blue (RGB) pixel data in a corresponding column are multiplied by coefficients that have been shifted in and stored in static shift registers or, optionally, internally pre-wired to provide a unity matrix. The three matrixed outputs are available at the output ports 6 clock cycles after the data is presented to the chip. If the data is presented to the chip during the 6 clock latency and continually thereafter, the output is valid for each clock cycle from thereon. If the period of the clock is set equal to a single pixel interval, then the color data can be processed in real time. The color matrixing operation performed by the present invention is set forth below.

$$\begin{bmatrix} R' \\ G' \\ B' \end{bmatrix} = \begin{bmatrix} a11 & a12 & a13 \\ a21 & a22 & a23 \\ a31 & a32 & a33 \end{bmatrix} \cdot \begin{bmatrix} R \\ G \\ B \end{bmatrix}, \quad (1)$$

where aij are the coefficients programmable by loading into the static registers or by hardwiring, R, G, and B are the input color signals and R', G' and B' are the processed output signals. This operation is represented by the circuit connection configuration illustrated in FIG. 1. In this circuit the contents of coefficient registers 10–14 are applied to one input of the multipliers 16–20 which receive at the other input the red color signal. The contents of coefficient registers 22–26 are applied to one of the inputs of multipliers 28, and 32 while the other input of the multipliers 28–32 receives the green input color signal. In this same manner the contents of coefficient registers 34–38 are applied to one of the inputs of multipliers 40–44 while the other input of the multipliers 40–44 receives the blue color signal. The outputs of the multipliers are added by adders 46–50 to produce the output values. As can be seen the color outputs are each a combination of all three of the color inputs of a single pixel in proportions controlled by the multiplication coefficients a11–a33.

When in the convolution mode, the circuit receives image data three pixels at a time in three consecutive pixel input cycles where only one of the color signals is provided, such as green, and multiplies nine pixel values by the corresponding nine coefficients stored in the static registers. The 20 bit products are truncated to 14 most significant bits for integrated circuit real estate conservation reasons. The products are then added together to provide a 16 bit output. However, as discussed above, to fit the present invention into an 84 pin package, the 10 most significant bits are preferably connected to the input/output pads. If 16 bits are required for a higher degree of accuracy, a package with a higher number of input/output pads must be used. The present invention implements the convolution operation in accordance with equation 2:

$$P_{o,s}(m,n) = \sum_{i=0}^{s-1} \sum_{j=0}^{s-1} a(i,j) P_{in}(m-i, n-j), \quad (2)$$

where $P_{0,s}$ and $P_{in}$ are the convoluted output and image input data, s is the size of the kernel, i and j are relative row and column pointers and a(i,j) is the kernel. This equation can be expressed in matrix form by:

$$\text{output} = \begin{bmatrix} a11 & a12 & a13 \\ a21 & a22 & a23 \\ a31 & a32 & a33 \end{bmatrix} \begin{bmatrix} n1 & n2 & n3 \\ n4 & n5 & n6 \\ n7 & n8 & n9 \end{bmatrix} \quad (3)$$

where n1–n9 are the input pixel values for one of the colors such as green. As illustrated in FIG. 2, the present invention uses the same coefficient storage registers 10–14, 22–26 and 34–38, multipliers 16–20, 28–32, and 40–44 and adders 46–50 as well as adder 52 to produce the convolved output. However, as will be seen by comparing FIGS. 1 and 2 the input routing of the signals is different.

Figure 2:
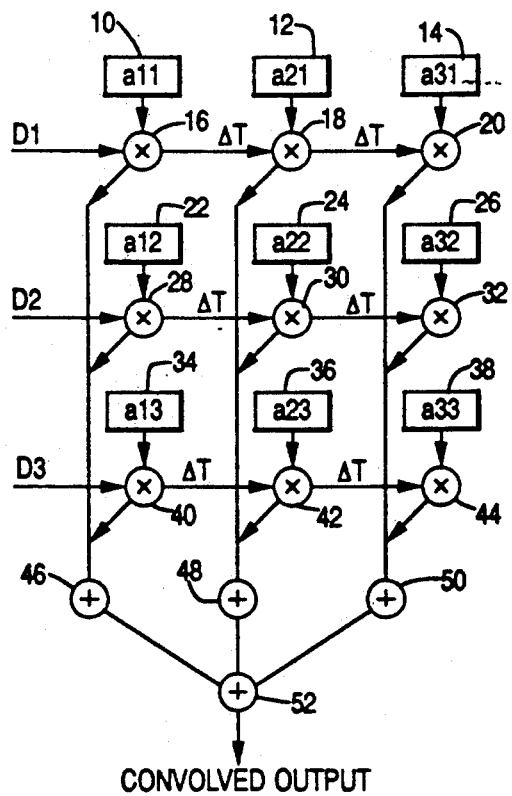
FIG. 2 illustrates the convolution operation performed by the circuit of the present invention.
Figure 3:
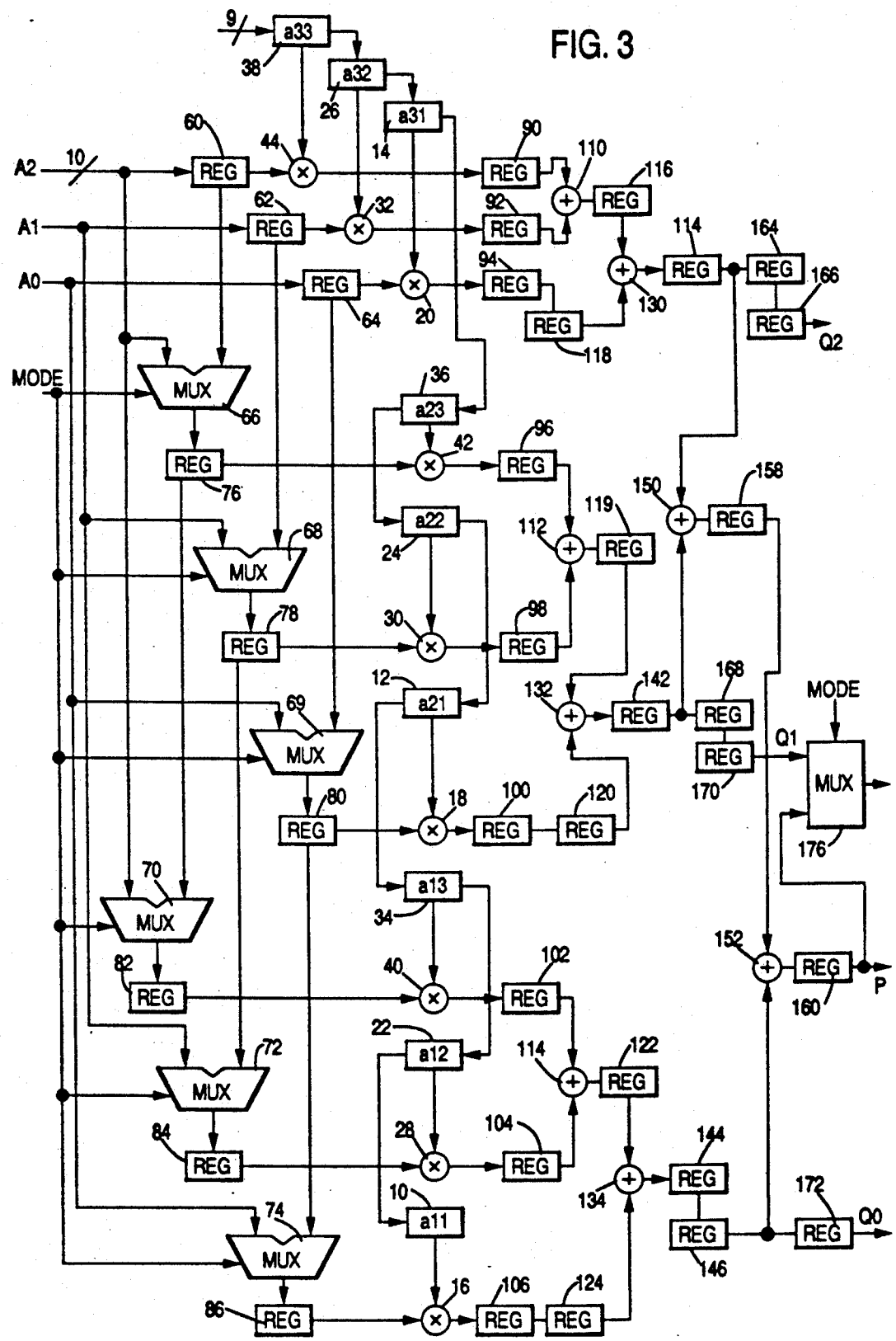
FIG. 3 illustrates the time delay registers, multiplexers and adders necessary to implement the mode convertible circuit of the present invention.

To reconfigure the multipliers and adders used for matrix multiplication in FIG. 1 into the configuration of FIG. 2, which performs the convolution operation, the present invention is provided with time delay registers and multiplexers as illustrated in FIG. 3. In this FIG. A2 corresponds to the B of FIG. 1 during the matrix operation and to D3 of FIG. 2 during convolution, A1 corresponds to G of FIG. 1 and D2 of FIG. 2 and A0 corresponds to R during the matrix operation of FIG. 1 and to D1 during the convolution of FIG. 2. Input registers 60–64, multiplexers 66–74 and registers 76–86 provide signal delay and routing for three lines of single color input data to the appropriate multipliers 16–20, 28–32 and 40–44 at the appropriate timing responsive to the mode selection selected by the user. For example, during the matrix operation, the mode select permits the left hand inputs of the multiplexers 66, 68, 69, 70, 72, 74 to pass through. Hence, if the red input signal is applied to the A0 input, the green input signal is applied to the A1 input and the blue input signal is applied to the A2 input then the same red input value is latched into registers 64, 80 and 86. The same green input value is latched into registers 62, 78 and 84, and the same blue input value is latched into registers 60, 76 and 82. The multipliers 16–20, 28–32 and 40–44 perform the multiplication corresponding to each of the rows of equations (1).

The summations corresponding to each of the rows of equation (1) are performed in a pipe-lined manner using registers 90–106, adders 110-14 114, registers 116–124, and adders 130–134. The result of each of the rows of equations (1) are latched in registers 140–144. These results are output at $Q_0$, $Q_1$ and $Q_2$ after an additional delay through registers 146, 164-172. This mode select permits Q1 to be output in the matrix mode. Although multadders 150 and 152 and registers 158 and 160 are operating their resultant output P is blocked by the multiplexer 176 from being output in the matrix mode. These adders and multiplexer come into play in the convolution mode. During the convolution operation instead of the registers 60–64, 76–80 and 82–86 being loaded simultaneously from the input lines, the inputs are staged. For example, during the first cycle register 64 stores the A0 input which is multiplied by multiplier 20. During the next cycle the data in register 64 is stored in register 80 and a new input value is loaded into register 64. In this way, the input data progresses from registers 60–64 to registers 76–80 and then to registers 82–86 in a delayed fashion as required by this pipelined convolution operation. On the output side, the multiplexer 176 selects the convolved output produced by adders 150 and 152 in accordance with equation 2. The outputs of registers 166 and 172 are unused in this mode.

Figure 4:
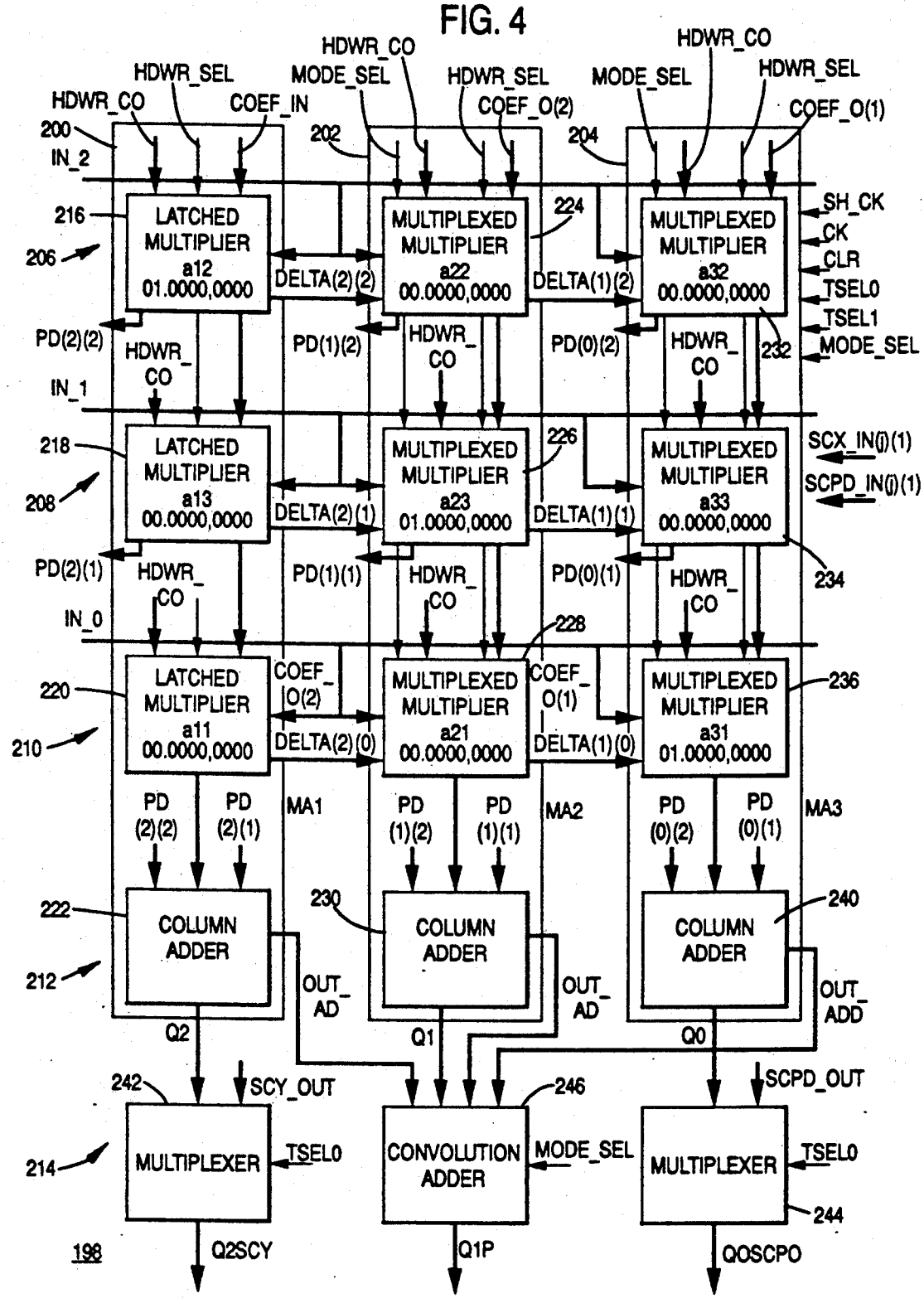
FIG. 4 is a block diagram of the component layout of the present invention when configured as a single integrated circuit.

The present invention, when implemented as a single integrated circuit 198, preferably has a component layout in a matrix form as illustrated in FIG. 4 where the matrix is arranged in three columns 200–204 and five rows 206–214. This circuit is preferably implemented using conventional CMOS technology. For an easier understanding of the drawings associated with the following description, the following chip interface signal abbreviations are used:

| | |
|---|---|
| CLR | Control signal for system reset, which initializes inputs to and outputs from multipliers, and system outs. |
| SH-CK | Clock for shifting coefficients. |
| CK | System clocking for dynamic registers |
| MODE-SEL | Mode selection for matrix multiplication or 2-D Convolution. Logical low selects matrix multiplication. |
| HDWR_SEL | Select hard-wired coefficients or programmable coefficients. A logical low selects programmable coefficients. |
| TSEL1, TSEL0 | |
| 0 1 | Scan test mode |
| 1 0 | Normal operation mode |
| 1 1 | Pseudo-random generator/signature analyzer mode |
| IN2 | pixel data input, 10 bit word length |
| IN1 | pixel data input, 10 bit word length |
| IN0 | pixel data input, 10 bit word length |
| Q2 | processed pixel data output, 10 bit word length |
| Q1 | processed pixel data output, 10 bit word length |
| Q0 | processed pixel data output, 10 bit word length |
| P | convolver output, 10 bit word length, 4 times higher weight than q2, q1, or q0. |

The inputs (in0–in2, where A0 equals in2, A1 equals in1 and A2 equals in)) to the circuit 198 enter along the row direction and the outputs (q0–q2) are produced in the column direction. The multipliers of the circuit comprise two basic multipliers a latched multiplier and a multiplexed multiplier and within each of these two types are two further subtypes which have different input and output connection configurations as will be discussed in more detail later. As can be seen in FIG. 4 the first column 200 includes three latched multipliers 216-200 where the latched multipliers 216 and 218 are illustrated in more detail in FIG. 5 and the latched multiplier 220 is illustrated in more detail in FIG. 6. The numbers in the multiple blocks indicate the preferred hardwired coefficient values for a unity matrix and the coefficient numbers correspond to the coefficient numbers used in FIGS. 1–3. The outputs of the latches multipliers 216–218 are fed to a column adder 222 as illustrated by the output label on multiplier 216 and the corresponding input label on multiplier 216 and the corresponding input label on the column adder 222. This method of showing the connections between the various circuits on the chip by using alphanumeric reference labels is continued throughout the following discussion of the chip. The second column includes multiplexed multipliers 224, 226 and 228 where the multiplexed multipliers 224 and 226 are shown in more detail in FIG. 7 and the multiplexed multiplier 228 is shown in more detail in FIG. 8. Once again, the multipliers in the second column 202 feed their outputs to a column adder 230. The third column 204 has a construction substantially identical to the second column and includes multiplexed multipliers 232 and 234 illustrated in more detail in FIG. 7 and multiplexed multiplier 236 illustrated in more detail in FIG. 8 all feeding column adder 240. Column adders 222 and 230 are illustrated in more detail in FIG. 14 while the column adder 240 is illustrated in more detail in FIG. 15. The column adders add the products resulting from the three multipliers in their corresponding columns and provide the necessary pipeline staging during the matrix and convolution operations. The fifth row includes conventional multiplexers 242 and 244 connected to the corresponding column adders 222 and 240 and a convolution adder 246 connected to the column adders 222, 230 and 240 in each of the columns 200–204. The multiplexers 242 and 244 are not necessary for the matrix and convolution operations but are used to multiplex test outputs with the regular chip outputs eliminating the need for extra/output during testing of the chip. The inputs scxin, scpdin and outputs scyout and scpdout are used for the scan chains during the testing mode. The circuit of FIG. 4 implements the invention as illustrated in FIG. 3 in a compact integrated circuit which minimizes the real estate used.

Figure 5:
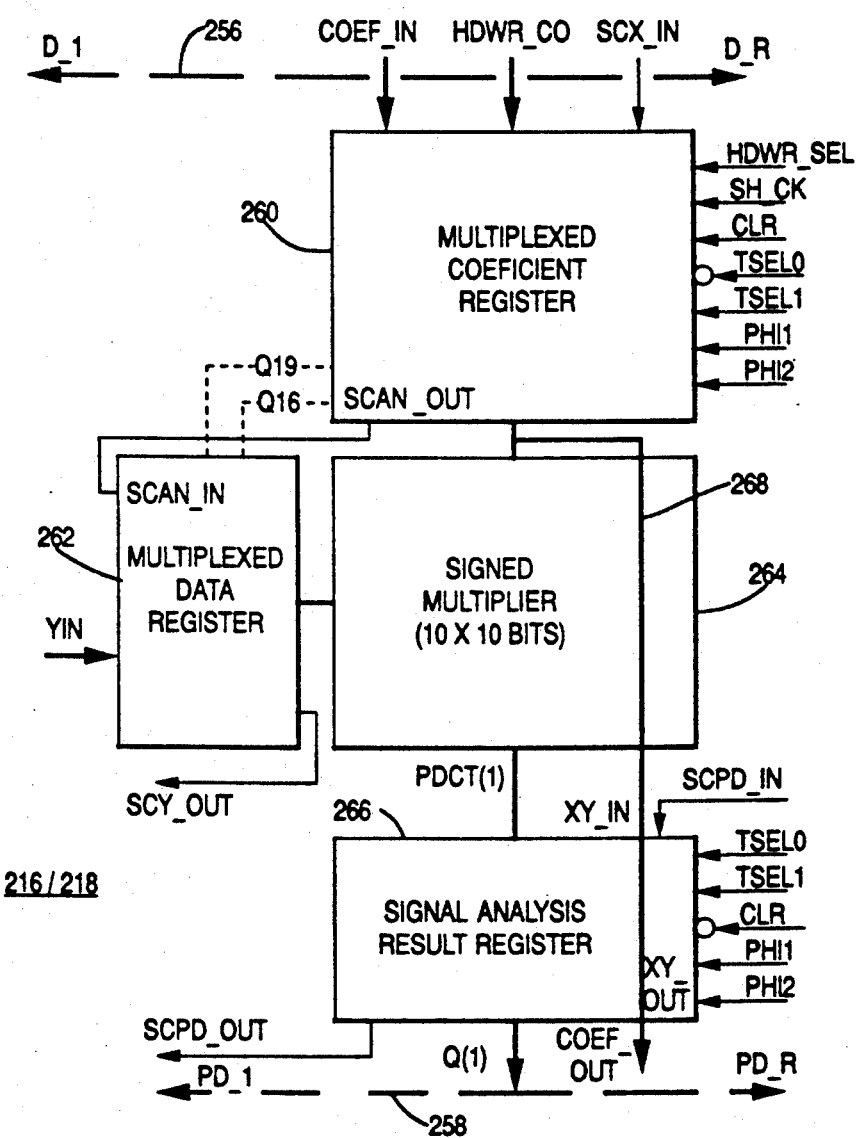
FIG. 5 is a block diagram of the components of the latched multipliers 216 and 218 of FIG. 4.
Figure 6:
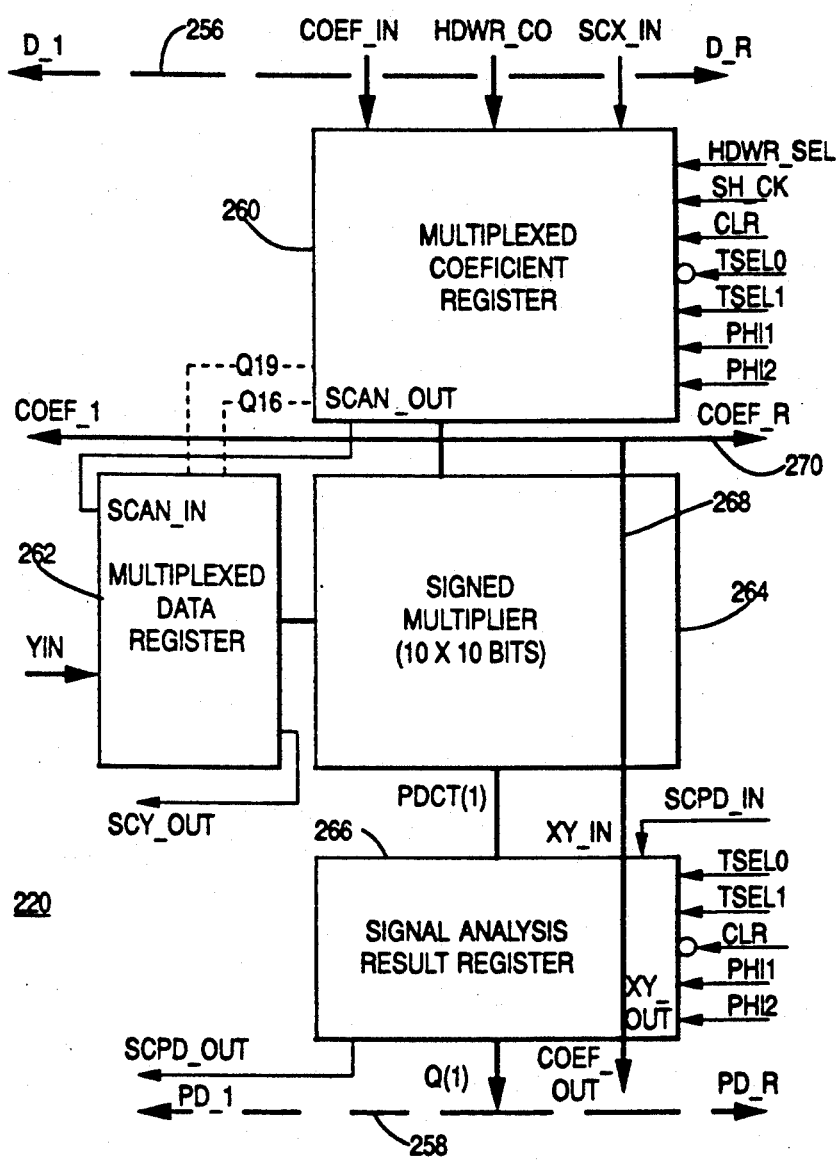
FIG. 6 is a block diagram of the components of the latched multiplier 220 of FIG. 4.
Figure 7:
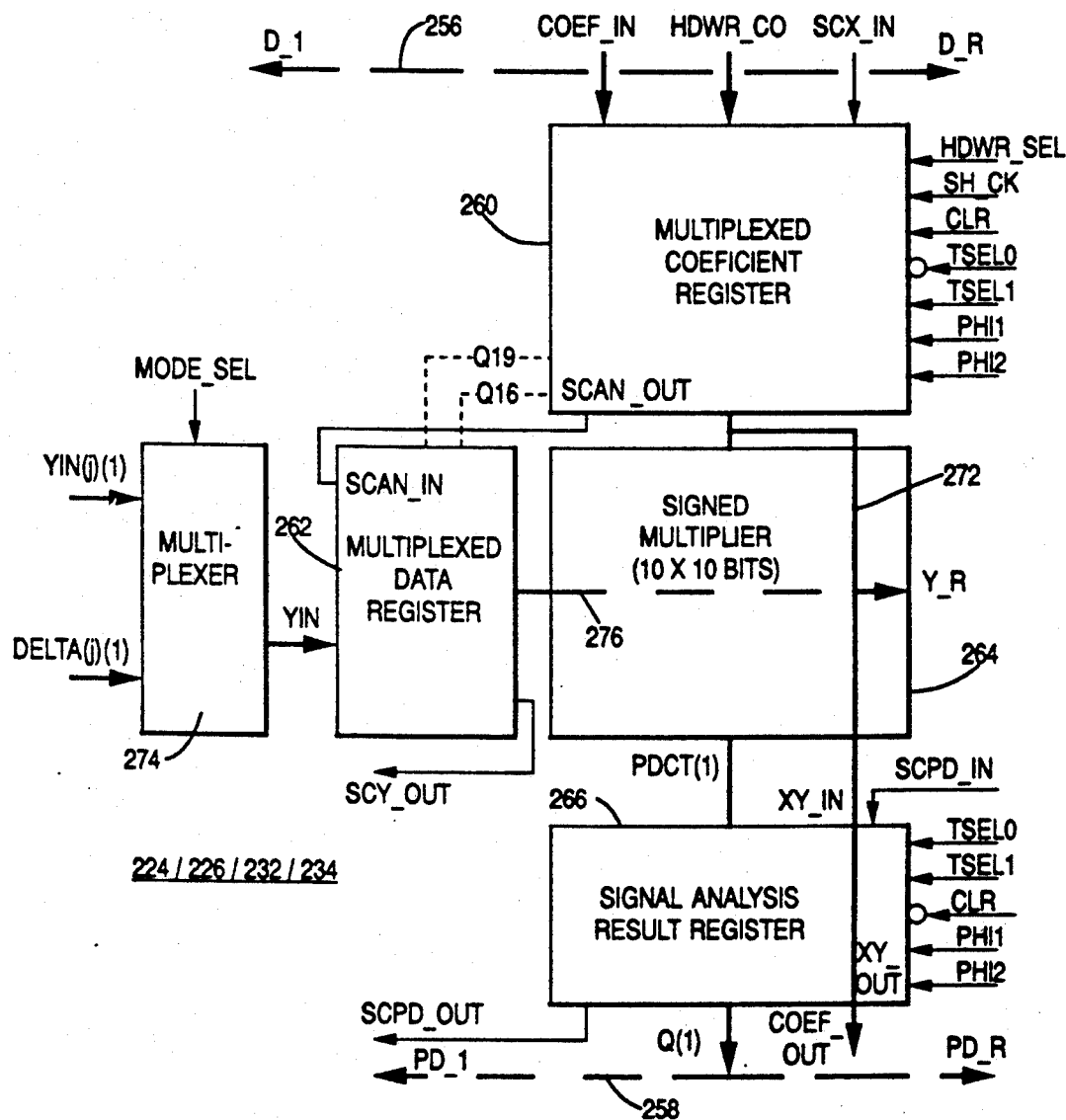
FIG. 7 is a block diagram of the components of the multiplexed multipliers 224, 226, 232 and 234 of FIG. 4.
Figure 8:
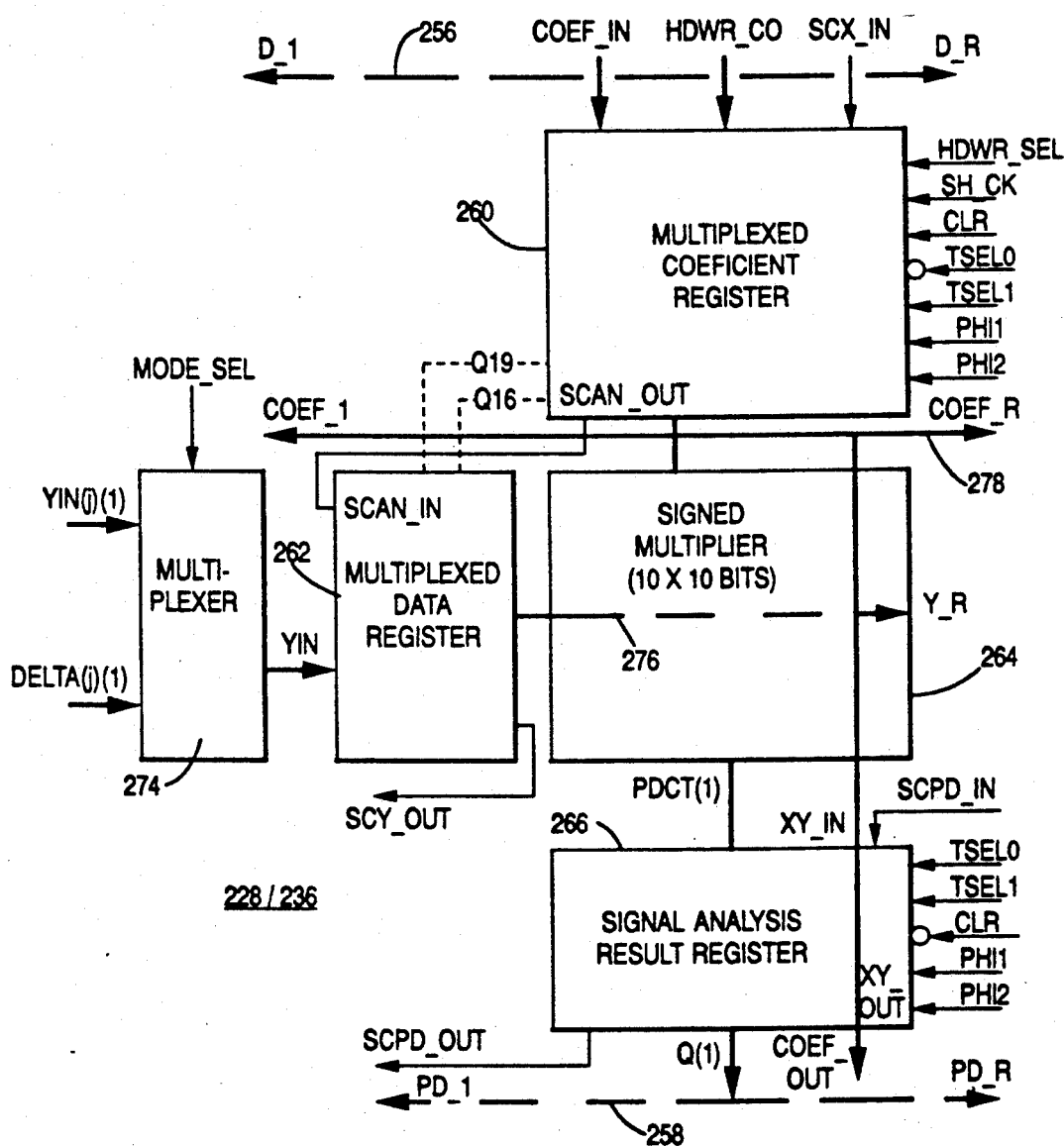
FIG. 8 is a block diagram of the components of the multiplexed multipliers 228 and 236 of FIG. 4.
Figure 9:
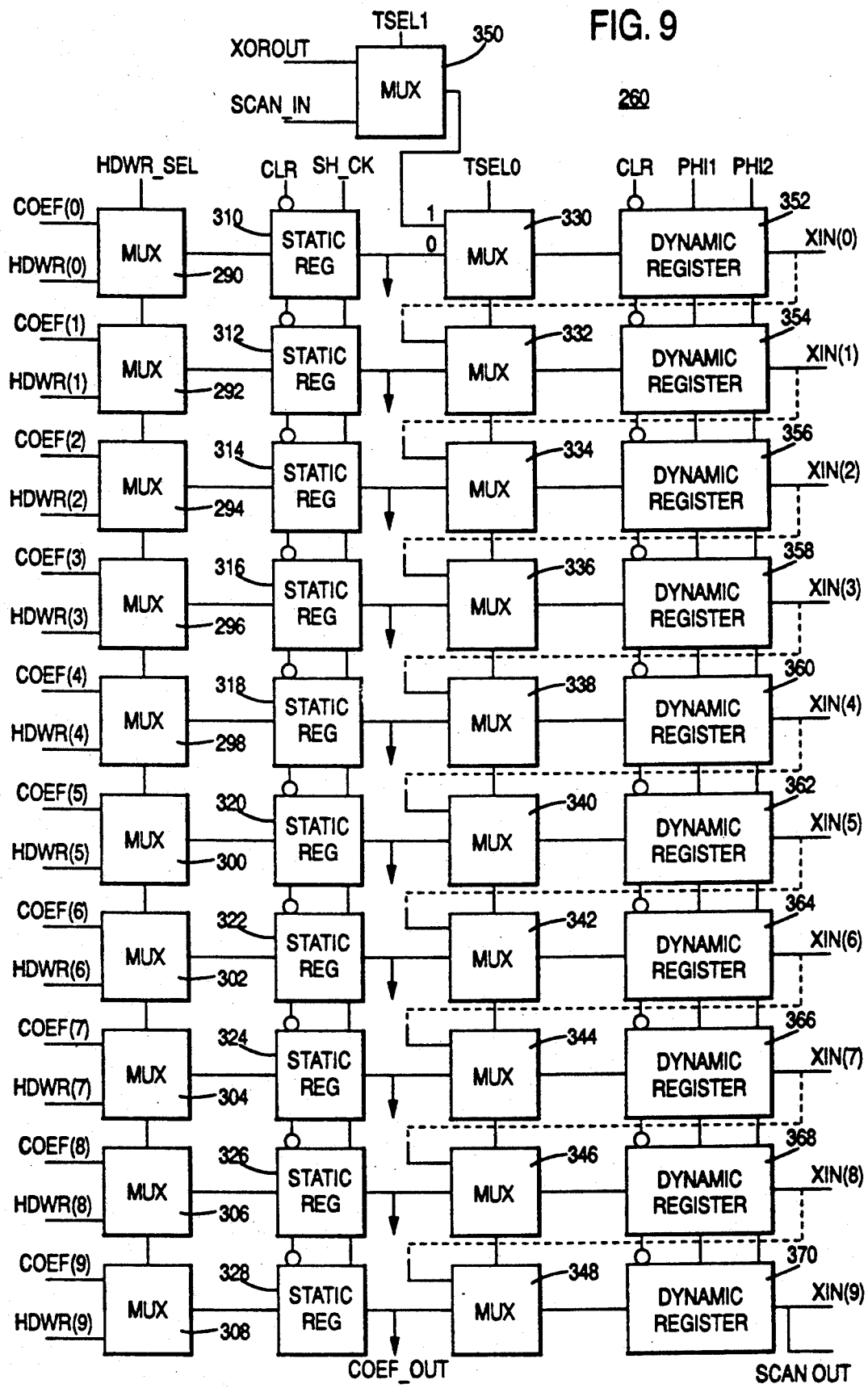
FIG. 9 illustrates the components of the multiplexed coefficient register of FIGS. 5-8.
Figure 10:
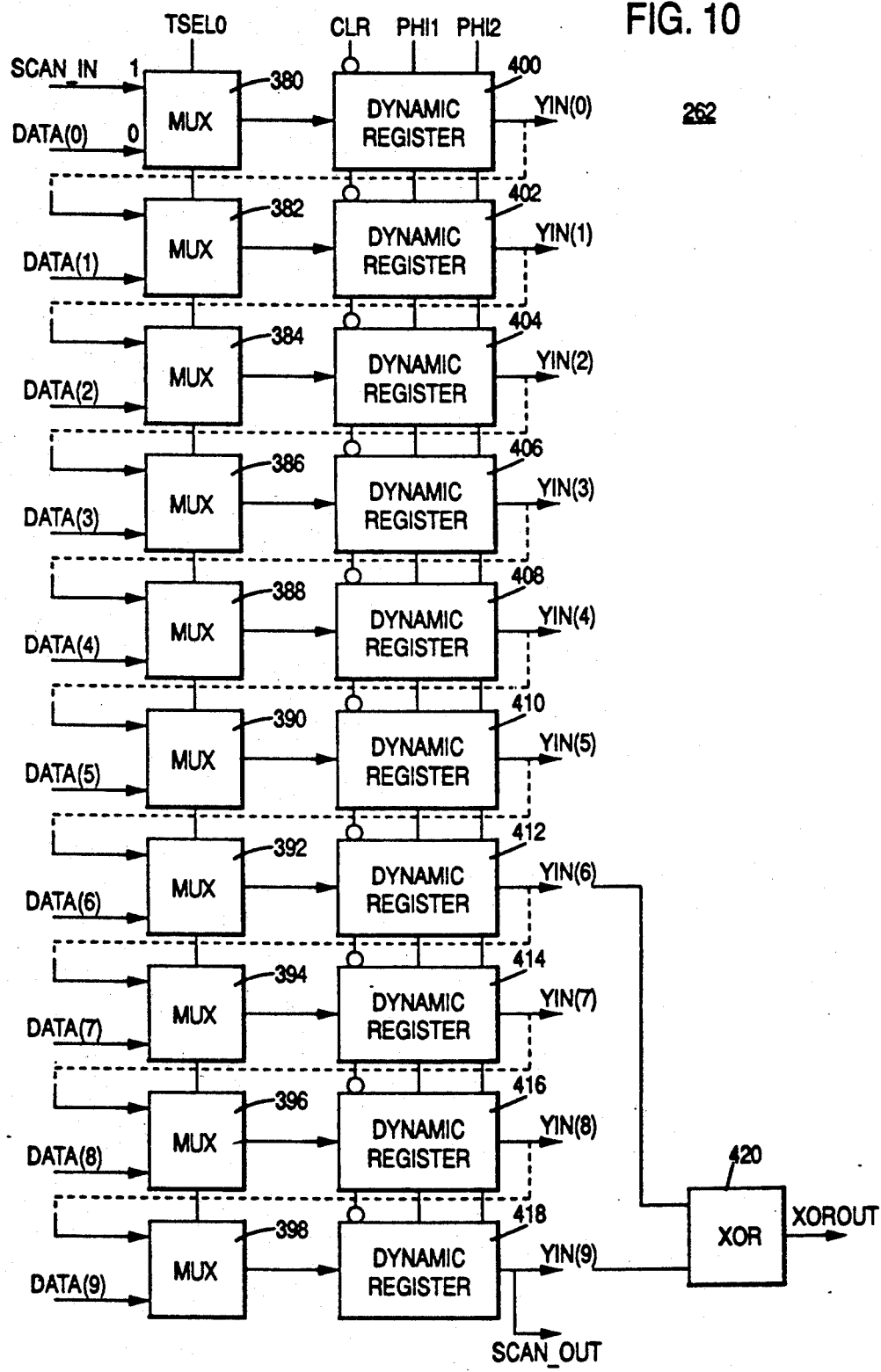
FIG. 10 depicts the components of the multiplexed data register 262 of FIGS. 5-8.

The latches multipliers 216 and 218, as illustrated in FIG. 5, include data transfer buses 256 and 258, a multiplexed coefficient register 260, the components of which are illustrated in more detail in FIG. 9, and a multiplexed data register 262, illustrated in more detail in FIG. 10, feeding a conventional signed multiplier 264 to produce an output. The output of multiplier 264 is supplied to and stored in a signal analysis result register 266 illustrated in more detail in FIG. 11. During initial loading of coefficients from outside the chip, as opposed to loading the hardwired coefficients, the static registers 260 are loaded serially into (See FIG. 9) in nine clock cycles from the single coefficient bus. The coefficients are loaded serially into the registers 260, as illustrated by the serial connection shown in FIG. 3 between for example registers 36 and 24. The input for the serial loading is shown entering register 260 from the top left. The multiplexed coefficient register 260 receives and stores the coefficient associated with the multiplier 264 for producing the product of the contents of the coefficient register 260 and the contents of the multiplexed data register 262, or selects a hardwired coefficient which preferably is used to implement a unity matrix although other matrices can be hardwired. As can be seen in FIG. 5, the output of the multiplexed coefficient register 260 is also supplied to the next latched multiplier in the column by a vertical coefficient transfer bus 268. This bus 268 is used for serial coefficient loading prior to operation. The scan input and output for scan testing are shown entering the top right of register 260 and 266 and leaving the bottom left. The latched multiplier 220 illustrated in FIG. 6 includes the same components 260-266, however, the coefficient transfer bus 270 runs both vertically and horizontally, allowing transfer of the coefficients to adjacent columns. The multiplexed multipliers 224, 226, 232 and 234 of FIG. 4 which have the same components 260-266 of FIG. 6, including a vertically oriented coefficient transfer bus, also include a conventional input multiplexer 274 as shown in FIG. 7 along with a data transfer bus 276 for transferring input data to the adjacent columns. The multiplexed multipliers 228 and 236 of FIG. 4 include the same components of FIG. 7 as illustrated in FIG. 8 with the addition of a horizontal and vertical coefficient transfer bus 278.

The multiplexed coefficient register 260 of FIGS. 5-8, as illustrated in FIG. 9, includes conventional single bit 2:1 multiplexers 290-308 which select between a hardwired coefficient or an input coefficient from the serial coefficient bus responsive to a selection signal. As previously mentioned, each register 260 is loaded in one of the nine coefficient loading cycles over the serial coefficient bus connecting the registers. The multiplexers supply the coefficient to conventional 1 bit static storage registers 310-328. The output of the static registers 310-328 is supplied to single bit 2:1 multiplexers 330-348. The single bit multiplexers 330-348 are designed to allow the serial output of the contents of the static registers 310-328. When the multiplexer 350 is included a serial test signal can be loaded into tiplexers 330-350 together with registers 352-370 can be configured as a pseudo random number generator as explained later. The dynamic registers 352-370 are thereby capable of outputting their contents in parallel to the signed multiplier 264 or of having their contents serially input or output for test purposes. The dynamic register serial load test value path is indicated by the dashed line. The selection inputs (tse10 and tse11) control scan test, normal and signature analysis modes of operation for this circuit. In the scan mode, data is input during a scan-in operation and output during a scan out operation through the noted signal lines. During the signature analysis mode an exclusive-or test signal input is provided to multiplexer 350 from register 262 as shown in FIG. 10.

The multiplexed data register 262 illustrated in FIG. 10 is substantially identical to the right hand portion of the multiplexed coefficient register of FIG. 9 and includes one bit 2:1 multiplexers 380-398 and conventional one bit dynamic registers 400-418 which allow the serial loading and serial output of test data as well as the parallel input and parallel output of the data to be multiplied. The multiplexed data register 262 also includes a conventional exclusive OR circuit 420 for implementation of a test pattern generation circuit, designed for signal output to the register 260. The modes discussed above for the register 260 apply to this register 262 The registers 260 and 262 are connected (scan-out to scan-in) in series and together with the feedback path from the exclusive-or output of register 262, to the multiplexer 350 input of register 260, form a pseudo random number generator that will theoretically generate a sequence of non-repeated 20 bit binary numbers for $2^{20}-1$ cycles of which 10 bits of the number reside in register 260 and 10 bits in register 262.

Figure 11:
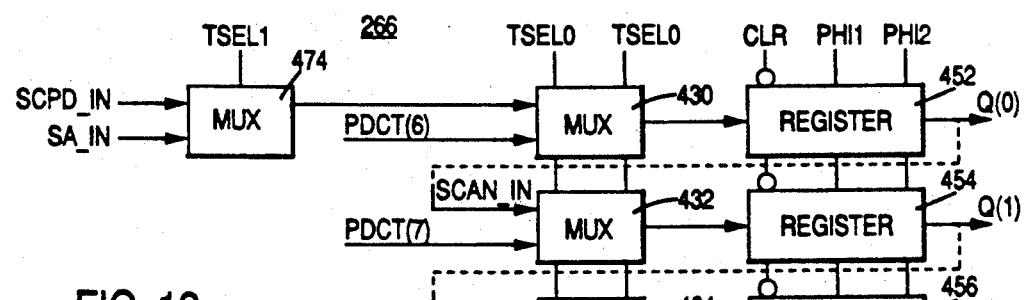
FIG. 11 shows the components of the signal analysis result register 266 of FIGS. 5-8.
Figure 12:
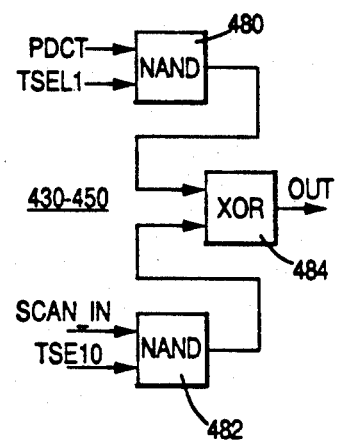
FIG. 12 illustrates the components of the exclusive-or multiplexers 430-450 of FIG. 11.

The signature analysis circuit generates $2^{20}-1$ different outputs by performing a polynomial division of a polynomial of degree 20, whose coefficients are zero or one, determined by the contents in registers 260 and 262 at each clock cycle, by the primitive polynomial:

$$X^{20}-1 \qquad (4)$$

as implemented by XOR 420. The output of each register of 260 and 262 is used as an input to a multiplier during self test. The registers 260 and 262 are designed for easy testing by including a The signal analysis result register shown in FIG. 11 includes exclusive-or multiplexers 430-450, the details of which are illustrated in FIG. 12. The multiplexers 430-450 receive the output from the signed multiplier 264 of FIGS. 5-8 and pass the one bit output to single bit dynamic registers 452-472. Although only 11 bits are shown in FIG. 11 for the signal analysis result register, this register is actually designed to hold and store 14 bits. The dynamic registers 452-472 can be loaded with a pseudo random test initialization value through multiplexer 474 from or with the scan-out data from a previous scan register.

As illustrated in FIG. 12, each of the exclusive-or multiplexers 430-450 includes two conventional NAND gates 480-482 and a conventional exclusive-or circuit 484. These circuits select between the product output produced by the signed multiplier 264, the serially loaded value for mux 474, or the XOR of the $n^{th}$ bit of 264 and the value in the previous n-1th bit registers 452-472 The later mode is used as parallel input for obtaining a signature analysis from multiplier 264. Since each of the nine multipliers 216-220, 224-228 and 232-236 have the ability for internal test generation and signature analysis of their outputs, all such circuits can be exercised in parallel.

Figure 13:
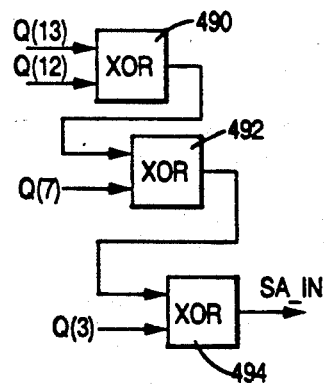
FIG. 13 illustrates the characteristic equation circuit used to perform signal analysis.

The multiple input signature analysis circuit illustrated in FIGS. 11-13, used for performing the signal analysis, includes three Exclusive-Or gates 490-494 which receive inputs from the 3rd, 7th, 12th and 13th outputs of the registers 452-472, and the mux circuits of FIG. 12. The circuit performs parallel signature analysis by using the irreducible characteristic equation set forth below in equation 5:

$$sa = x^{14}+x^{10}+x^6+x+1 \qquad (5)$$

This equation and the serially connected registers will test all the possible input combinations to the multiplier in a random sequence allowing the multiplier and registers to be completely tested. Equations 4 and 5 have been chosen for the circuit being tested so that the repeat length is optimized for the circuit. The multiplier outputs being, at each bit, exclusive-ored with the contents of the previous register along with the xor feedback of FIG. 13, will produce a resulting value in registers 452-472 after $2^{20}-1$ clock cycles. The value is a compressed signature of all resulting outputs of 14 bits of the multiplier. This signature has a very high probability of determining correct operation of the multiplier.

Figure 14:
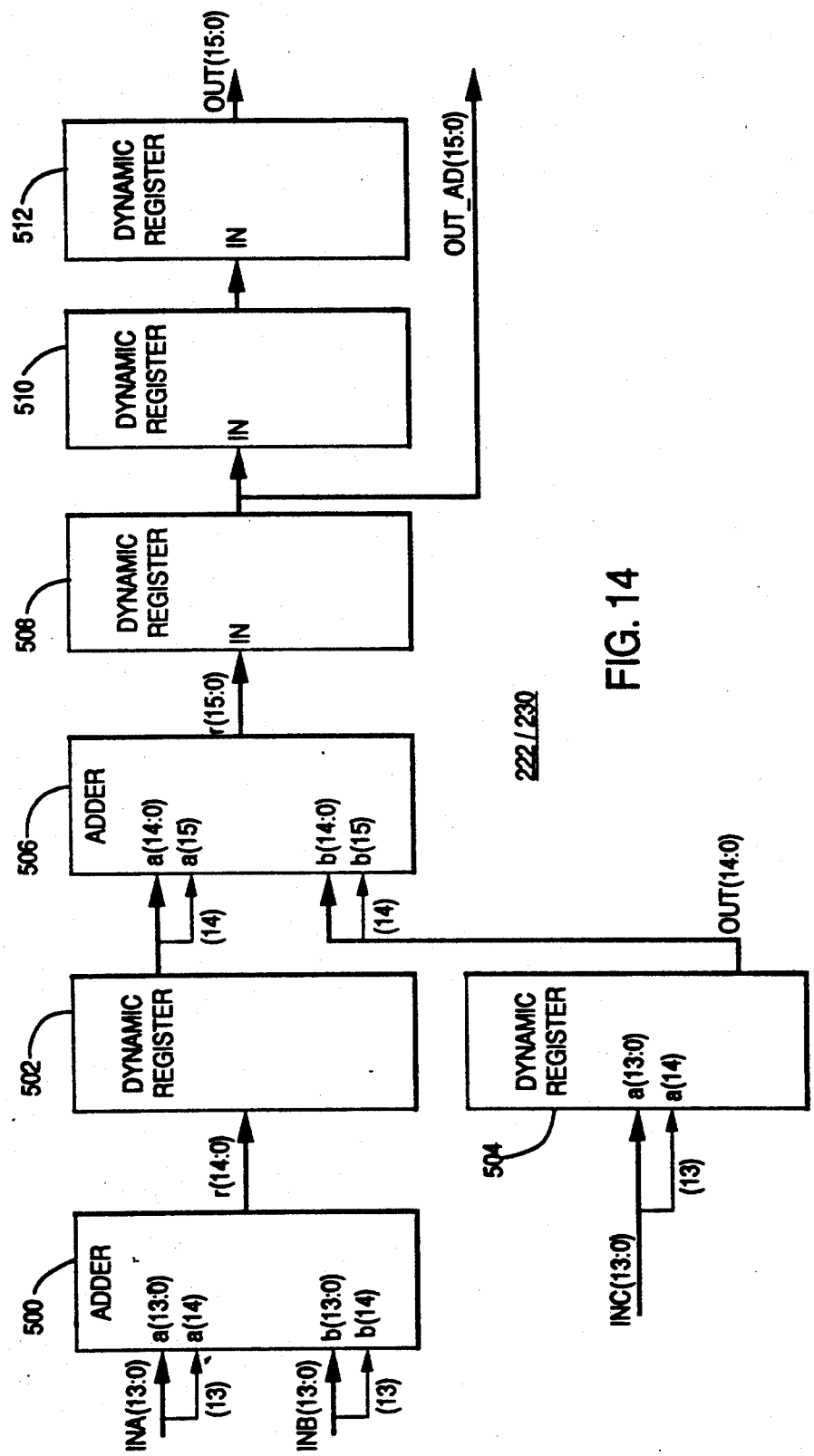
FIG. 14 depicts the components of the column channel adders 222 and 230 of FIG. 4.
Figure 15:
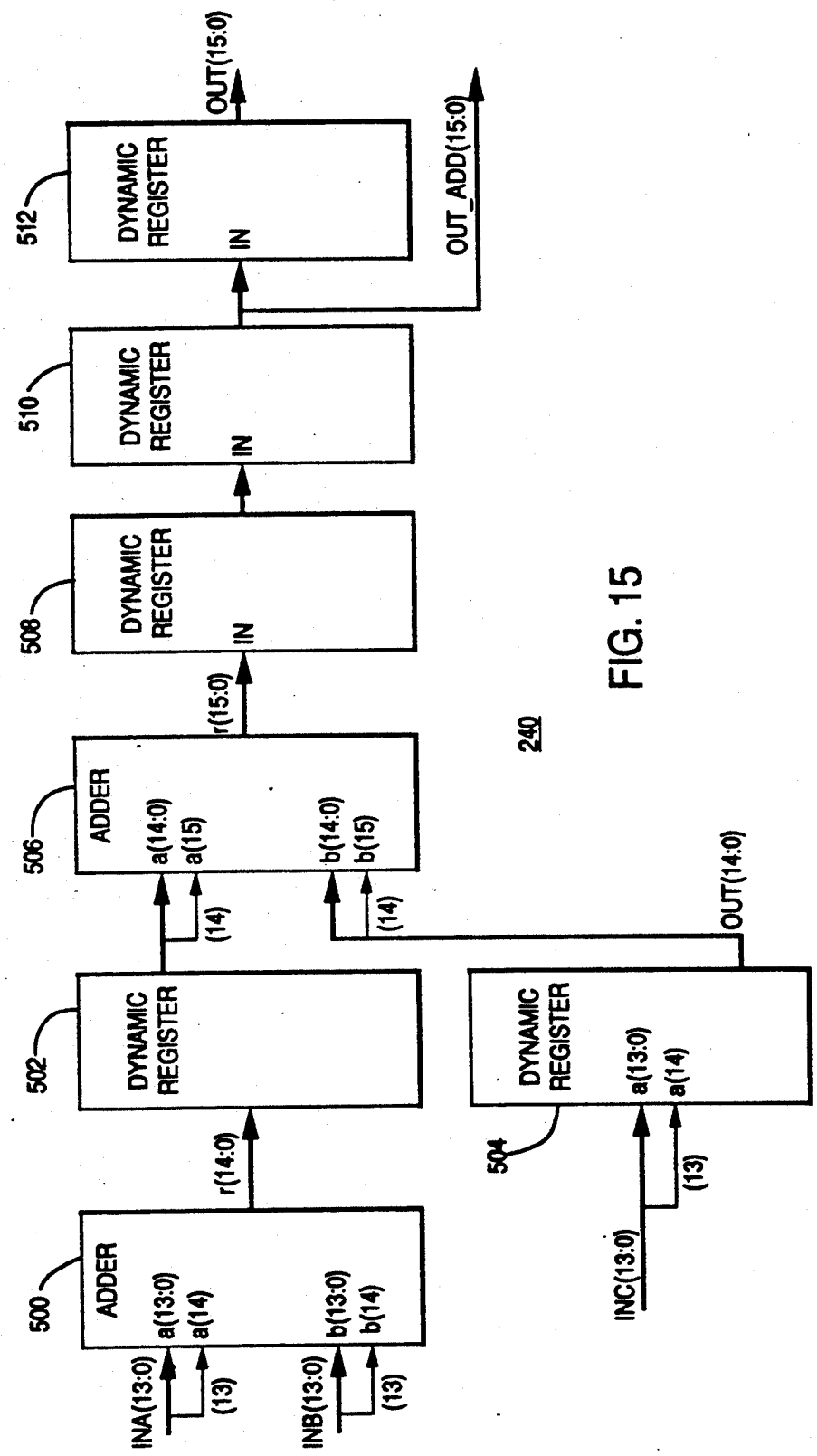
FIG. 15 illustrates the components of the column adder 240 of FIG. 4.

The column adders 222 and 230 of FIG. 4, as illustrated in FIG. 14, each include a conventional two input 15 bit adder 500 which produces an output which is stored in a conventional dynamic register 502. A second conventional dynamic register 504 receives and stores the third input to the column adder and supplies it to a second adder 506 which produces a 16 bit output. This output is supplied and stored in a conventional dynamic register 508. The output of the dynamic register 508 is either directly output to the convolutional adder 246 of FIG. 4 or delay compensated in conventional dynamic registers 510 and 512. The column adder 240 of FIG. 4, as shown in FIG. 15, uses the same components as the adder of FIG. 14 except that the output to the convolutional adder 246 is delayed by one extra stage.

Figure 16:
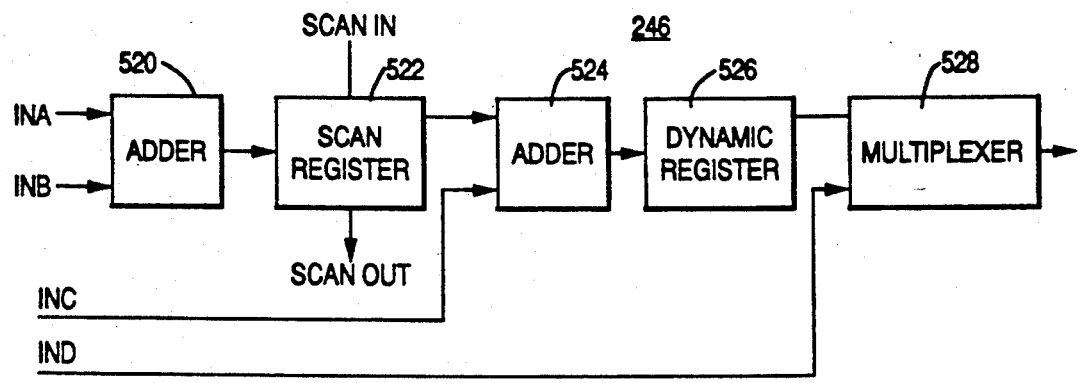
FIG. 16 shows the components of the convolution adder 246 of FIG. 4.

The components of the convolutional adder 246 are illustrated in FIG. 16. The input to the convolutional adder 246 is supplied to a conventional adder 520. The output of the adder 520 is supplied to a scan register 522 which is of the same construction as the register of FIG. 10 without the exclusive-or circuitry. The convolutional adder includes a second adder 524 which receives the third input. This adder stores the results in storage register 526. The output of the storage register 526 is passed to a multiplexer 528 which selects between the output produced by the convolution operation or the input provided from the corresponding column adder during the matrix multiplication operation.

Figure 17:
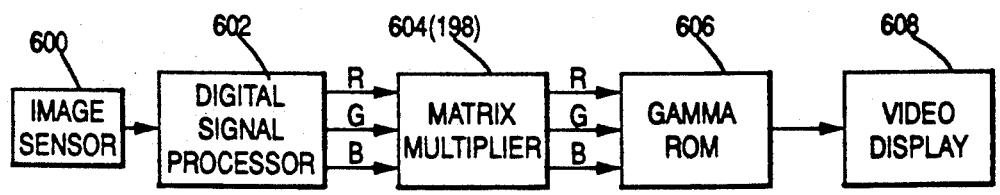
FIG. 17 illustrates the use of the matrix function of the present invention in producing a video display.

FIG. 17 illustrates the present invention used to convert an image signal from an image sensor 600, such as the Kodak KAF-100 which includes the Kodak 3G color filter array and that produces a single output signal, which is converted into red, green and blue color signals by a digital signal processor 602. In this situation, when the invention is configured as a matrix multiplier 604, the multiplier 604 optimizes the color reproduction of the imaging chain which is then converted by a conventional gamma ROM 606 into a signal suitable for application to a video display 608.

Figure 18:
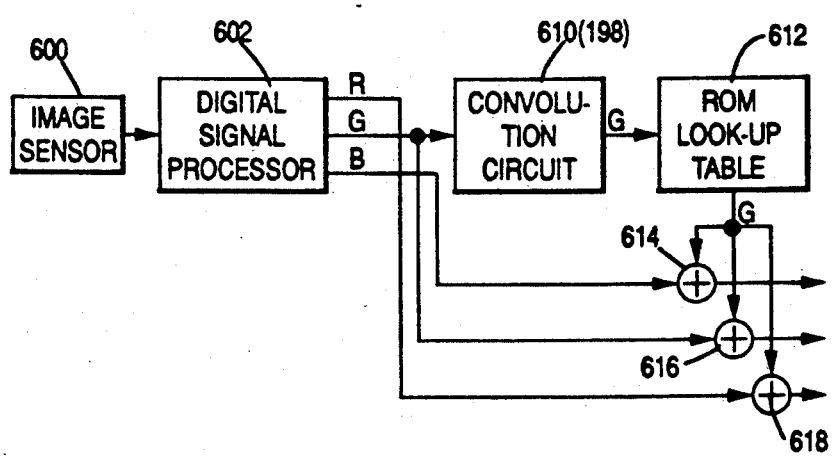
FIG. 18 illustrates edge enhancement of the image using the convolution function.

FIG. 18 illustrates the present invention implemented as a convolution circuit 610 for image edge enhancement. In this situation the convolution circuit 610 produces a single edge detail signal which is used by a conventional ROM lookup table 612 to produce an appropriate boost signal for enhancement purposes. The input to the circuit 610 is three lines of a single color, such as green, requiring that the processor 602 include three lines of storage or that such storage be provided at the input to the circuit 610.

Figure 19:
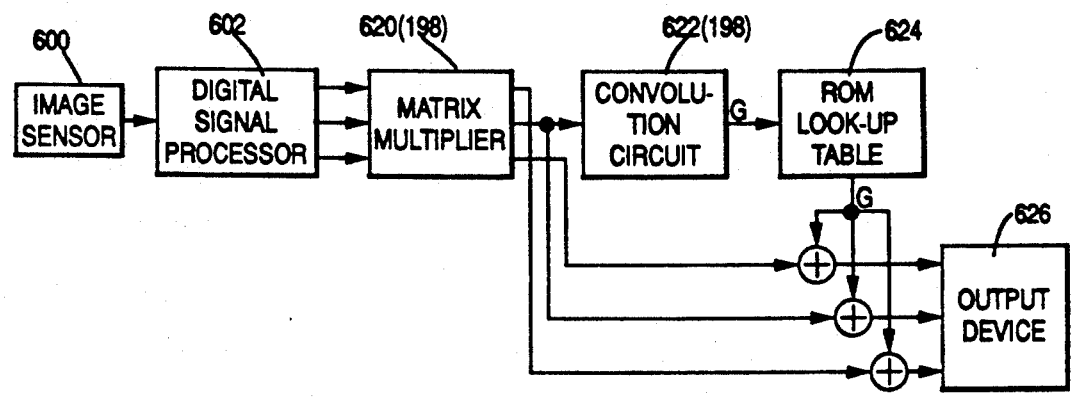
FIG. 19 depicts the use of the invention in both functions for a color copier.

FIG. 19 illustrates two of the circuits of the present invention being used in a color imaging chain. The first use of the invention is as a matrix multiplier 620 followed by convolution circuit 622 used with a conventional ROM look-up table to perform edge enhancement in the same manner as discussed above. The edge enhanced color output is supplied to an output device 626 which may be a video display or a hard copy unit. Once again three lines of storage (not shown) is necessary at the input to the circuit 622.

Figure 20:
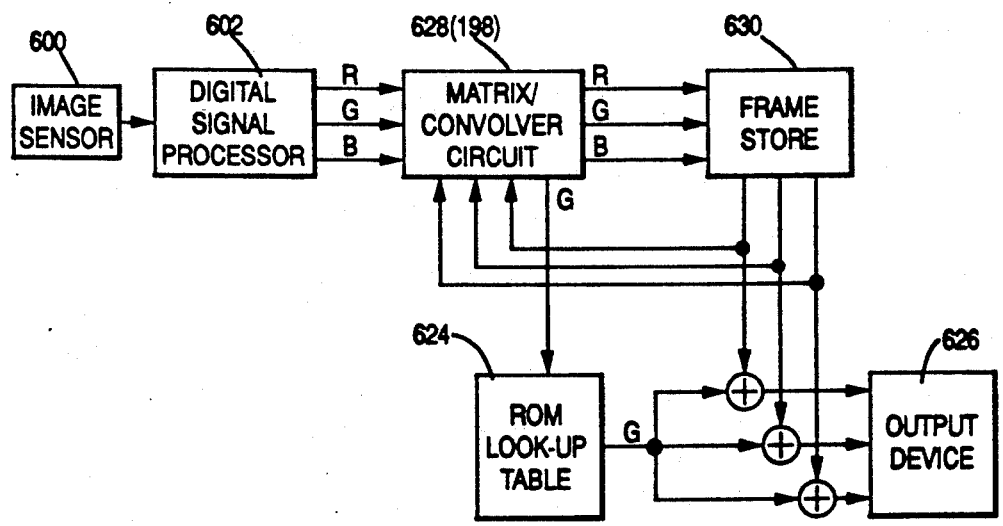
FIG. 20 illustrates use of the invention in the reconfigurable mode for a color copier.

FIG. 20 illustrates the use of the present invention in another imaging chain where the same circuit 628 is reconfigured from a matrix multiplier into a convolver circuit with the matrix multiplication results being intermediately stored in a frame store 630 prior to convolution. After the color matrixed data is stored in the frame store, the single color pixel values for nine pixels must be pipelined to the convolver 628 before the edge enhancement detail signal is produced. When the edge enhancement signal is produced the corresponding RGB data for the nine pixels needs to enhancement signals from table 632. The output of the frame store is convolved to provide the edge enhancement signal which is combined with the frame store output. As can be seen, the use of the invention in this configuration requires careful and correct timing of the double outputs of the frame store during the edge enhancement operation because of the latency of the chip.

Because a scan test path, an exhaustive test pattern generator, and a signature analysis circuit are provided for each of the multipliers 216-220, 224-228 and 232-236 the multiplication functions of the circuit can be easily tested. For example, during scan testing inputs are loaded, the chip is cycled once and the output is checked for correctness. During built in self testing a non-zero vector is loaded, the chip is clocked for the required number of cycles and the signature is checked against an expected output in a conventional signature analysis technique. Of course it is possible to add equivalent test circuits to the adders 222, 230, 240 and 246 to test their functioning as well.

This circuit is useful not only in image processing for video display and in color copier operations but also in the health science area where the chip can be used for enhancing medical images produced by CAT scan, NMR and ultrasound devices. The circuit can also be used in a bilinear interpolation circuit to produce a sum of products where several of the chips of the present invention would be connected for computing shifted, rotated or scaled data.

To improve the programmable capabilities of the chip, it is possible to include on chip storage, in the form of RAM or EPROM, for storing sets of coefficients that can be loaded into the coefficient storage register depending on the mode selected and the type of operation within the mode. For example two sets of matrix multiplication coefficients can be stored one for color reproduction and one for converting from RGB space into, for example, YIQ space. This storage would allow the coefficients to be changed during every clock cycle if desired.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A circuit for selectable matrix multiplication and convolution operations and receiving parallel inputs at a data rate at data inputs and having a mode selection input, comprising:
   input routing means for routing the parallel inputs at the data rate responsive to selection of one of a matrix multiplication mode and a convolution mode, and said input routing means comprising:
   input buffer registers connected to the data inputs and to said operation means;
   first multiplexers connected to the data and mode selection inputs and to said input buffer registers;
   first storage buffer registers connected to said first multiplexers;

second multiplexers connected to the data and mode selection inputs and to said first storage buffer registers; and second storage buffer register connected to said second multiplexers;

operation means for performing, at the data rate, one of a matrix multiplication and a convolution operation using the routed inputs responsive to the selection and producing parallel outputs at the data rate during matrix multiplication and a convolution output at the data rate during convolution, said operation means comprising:

coefficient register storing coefficient;

first multipliers connected to said input buffer registers and said coefficient registers;

second multipliers connected to said first storage buffer registers and said coefficient registers;

third multipliers connected to said second storage buffer register and said coefficient registers;

a first adder connected to said first multipliers;

a second adder connected to said second multiplies;

a third adder connected to said third multipliers; and a fourth adder connected to said first, second and third adders.

2. A circuit for selectable matrix multiplication and convolution receiving data over data inputs, and a mode selection over a mode input, said circuit comprising:

first input registers connected to said data inputs;

first coefficient registers;

first multipliers connected to said first input and coefficient registers;

first output registers connected to said first multipliers;

first adders connected to said first output registers;

first multiplexers connected to said data inputs, said first input registers and said mode selection input;

second input registers connected to said first multiplexers;

second coefficient registers;

second multipliers connected to said second input and coefficient registers;

second output registers connected to said second multipliers;

second adders connected to said second output registers;

second multiplexers connected to said data inputs, said second input registers and said mode selection input;

third input registers connected to said second multiplexers;

third coefficient registers;

third multipliers connected to said third input and coefficient registers;

third output registers connected to said third multipliers;

third output registers connected to said third multipliers;

third adders connected to said third output registers;

buffer registers connected to said first, second and third adders;

fourth adders connected to said buffer registers; and an output multiplexer connected to said second and fourth adders and to said mode input.

3. An integrated circuit for selectably performing matrix multiplication and convolution, comprising:

multipliers arranged in a matrix of columns and rows on a substrate, each of said multipliers comprising:

a coefficient register including a multiplexer selecting one of a hardwired input and an input coefficient and being serially loadable with a pseudo random test signal;

a result register including a signal analysis serial output circuit;

a data register producing the pseudo random test signal; and a signed multiplier connected to said coefficient register, result register and data register;

column adders connected to said result registers in corresponding columns and located in corresponding columns;

a convolution adder connected to said column adders and located in one of the columns; and means for selectably routing inputs and outputs to and from said multipliers, said column adders and said convolution adder responsive to selection of one of the matrix multiplication and the convolution.

* * * * *